Aug. 7, 1956  F. L. STAHL  2,757,678
AUTOMOBILE COVER
Filed Oct. 26, 1953
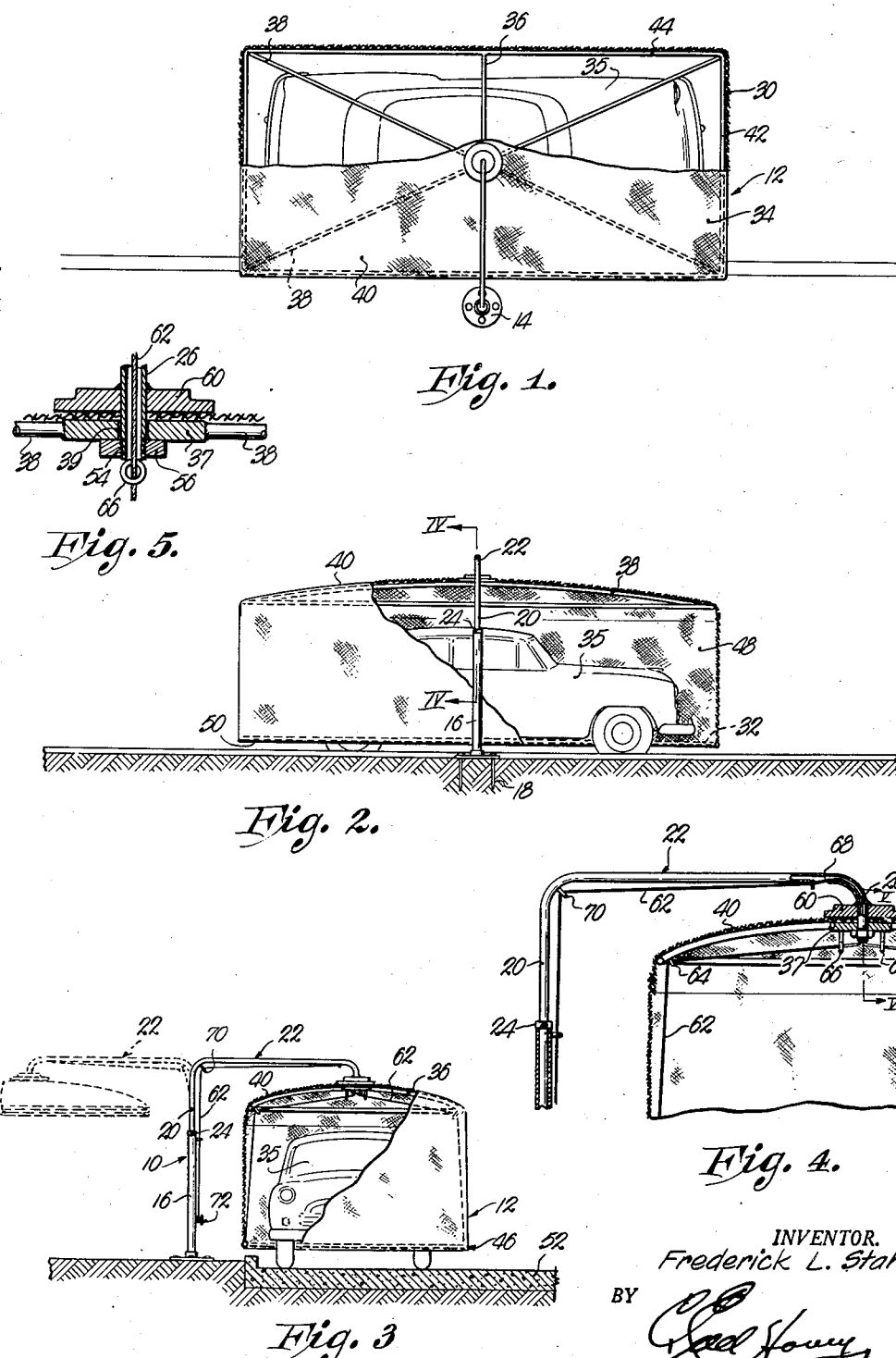
INVENTOR.
Frederick L. Stahl
BY
ATTORNEY.

United States Patent Office 2,757,678
Patented Aug. 7, 1956

2,757,678

AUTOMOBILE COVER

Frederick L. Stahl, Kansas City, Kans.

Application October 26, 1953, Serial No. 388,279

3 Claims. (Cl. 135—8)

This invention relates to shelters for automobiles, and particularly to a cover assembly for use where no garage is available which assembly is readily adapted for movement from one location to another.

It is the most important object of the present invention to provide a hood-like cover assembly for automobiles which is vertically collapsible to permit removal of an automobile from a chosen parking area.

Another important object of this invention is the provision of supporting structure for such aforesaid cover assembly which can be swung horizontally away from a parking area to clear such area for unobstructed use after the automobile is removed.

A further object of this invention is to provide mounting means for the said supporting structure in the nature of ground engaging stakes which facilitate movement of the supporting structure to a new location in a minimum of time.

It is a still further object of the present invention to provide a means for releasably attaching the cover assembly to the supporting structure so that the two can be quickly disassembled for movement or for storage.

With these and other objects in view, the invention generally comprises a collapsible hood-like shelter for automobiles, which shelter is suspended from a rotatable supporting structure so that, when not in actual use, the entire assembly may be swung clear of the street or drive area where an automobile is parked.

Additional objects will be made clear or become apparent as the following specification progresses, reference being had to the accompanying drawing, wherein:

Figure 1 is a top plan view of the cover assembly of the present invention, parts being broken away and in section to reveal details of construction;

Fig. 2 is a side elevational view of the cover assembly of Fig. 1;

Fig. 3 is an end elevational view, similar to Figs. 1 and 2, with the dotted line construction illustrating the swung away position of the assembly;

Fig. 4 is an enlarged, fragmentary, sectional view taken substantially on the line IV—IV of Fig. 2, showing details of construction of the supporting structure and of the cover assembly, per se; and Fig. 5 is a sectional view, taken on line V—V of Fig. 4.

Since many modern homes and apartments are not provided with garages, the automobile owner finds it necessary to either leave his car unprotected or to procure some weather-proof cover which he can spread over his car when it is not in use. The disadvantages of the tarpaulin type cover, now in general use, are the difficulty involved and the time consumed in spreading and lashing the cover each time it is used. The cover assembly illustrated in Figs. 1–5, inclusive, obviates these and other difficulties by providing a shelter, part of which is easily raised and lowered to permit access, and which can be removed from its overlying position with relation to the street when not in use.

Referring now to the accompanying drawing, the automobile cover of the present invention includes a supporting structure, broadly designated by the numeral 10, and a collapsible hood-like cover 12.

The supporting structure 10 has a base 14 to which upright standard 16 is rigidly attached. Base 14 is secured in place by means of elongated, ground engaging stakes 18, passing through a plurality of perforations in the base 14.

The upright leg 20 of substantially L-shaped arm 22 is rotatably mounted in a socket in standard 16, and held against rotation by a set-screw 24. The leg 26 of arm 22 is parallel to leg 20.

A hood-like automobile cover 12 is comprised of an upper frame 30, a lower frame 32, and a hood 34, of suitable weather-proof material. Hood 34 has a top wall 40 made of sheet material of any kind, either flexible or rigid, and a side wall 48 depends from the marginal edges of top wall 40.

The upper frame 30 is rectangular, conforming generally to the shape of an automobile 35, and has transverse rib 36 and diagonal ribs or braces 38, each of which is cut in half and secured to the periphery of circular disc 37, having a central opening 39, which is also the median point of the top wall 40 of hood 34. As is best illustrated in Figs. 2 and 3, the ribs 36 and 38 are bowed upwardly from the sides 42 and 44 of frame 30 to present an arcuate configuration. The ribs and sides of frame 30 and of lower frame 32 are made up of any suitable lightweight piping, for example, aluminum.

In addition to top wall 40, hood 34 has a continuous side wall 48 which presents a peripheral edge 50 proximal to the surface 52 on which the automobile 35 is parked. Lower rectangular frame 32 is fastened by stitching, or other means, to the edge 50, to maintain the shape of the hood 34 and to hold side wall 48 taut when the hood 34 is in the lowered position illustrated in Figs. 2 and 3.

The means for attaching the cover 12 to supporting structure 10 is best illustrated in Figs. 4 and 5. Leg 26 is externally threaded, as at 54, to receive locking nut 56. Disc 37 is perforated, as at 39, to receive the vertical section of leg 26 extending beyond plate 60 which is welded to leg 26 to provide stability for the entire cover 12.

Hoisting cables 62 are fastened to the longitudinal side pieces of lower frame 32 intermediate the ends thereof, and pass through rings 64 located at the outer extremities of rib 36. The cables 62 extend from rings 64, respectively, to rings 66, through the open end of leg 26, perforations 68 in arm 22, and a series of rings 70 located at various points along leg 20 and standard 16. The free ends of cables 62 are secured to a cleat 72 on standard 16.

In operation, the supporting structure 10 is placed in the desired location, beside a street or driveway, and secured in place by stakes 18. The next step, in assembly, is to attach the cover 12, having hood 34 in place, to threaded end 54 of leg 26, and to lock the disc 37 against plate 60 by means of nut 56.

When the cables 62 have been led through the various rings and through leg 26, it is seen that a cover 12 has been provided which can be hoisted to the collapsed position shown by the dotted lines of Fig. 3. When set screw 24 has been loosened, the collapsed cover 12 may also be swung away from the drive or street on which the automobile 35 is parked so that it will not interfere with other uses of the parking area when the automobile 35 is not parked and covered.

Having thus described the invention what is claimed as new and desired to be secured by Letters Patent is:

1. In an automobile cover assembly, a support including a hollow, tubular upright standard and an arm carried by the standard for rotation on a vertical axis, said arm being provided with a depending leg at the outermost end thereof; an open bottom hood of flexible, weather-proof material having a top wall and a continuous side wall provided with a lowermost peripheral edge; a substantially horizontal, uppermost frame disposed in underlying, supporting relationship to said top wall, said frame including a plurality of arcuate ribs terminating at a median point above the plane of said frame and a centrally perforated disc attached to and interconnecting said ribs at said median point; a lowermost frame fastened to the hood throughout the length of said peripheral edge whereby to hold said side wall taut; structure attaching the disc to said leg with the leg extending through the disc; and hoisting means interconnecting the frames and said support, said means including cables extending upwardly from the frames within said hood and through said leg and arm, the latter being provided with an opening intermediate the ends thereof rendering the cables accessible for raising and lowering the lowermost frame with respect to the uppermost frame.

2. In an automobile cover assembly as set forth in claim 1 wherein said structure includes a plate provided with a central opening for receiving said leg, means rigidly attaching the leg to the plate within said opening and a lock nut for clamping the disc and said top wall of the hood against said plate, said leg being threaded adjacent the outermost end thereof for receiving the nut.

3. In an automobile cover assembly as set forth in claim 2 wherein said hoisting means includes rings on the frames, the disc, the arm and the standard for guiding said cables and a cleat on the standard for receiving the cables to hold the frame in the raised position.

References Cited in the file of this patent

UNITED STATES PATENTS

| | | |
|---|---|---|
| 757,175 | Burland | Apr. 12, 1904 |
| 1,261,812 | Higgins | Apr. 9, 1918 |
| 1,285,766 | Martin | Nov. 26, 1918 |
| 1,759,628 | Pellegrino | May 20, 1930 |
| 2,547,896 | Wellen | Apr. 3, 1951 |